United States Patent
Hagmann

(10) Patent No.: US 9,927,461 B2
(45) Date of Patent: Mar. 27, 2018

(54) APPARATUS AND ALGORITHM FOR CARRIER PROFILING IN SCANNING FREQUENCY COMB MICROSCOPY

(71) Applicant: Mark J. Hagmann, Salt Lake City, UT (US)

(72) Inventor: Mark J. Hagmann, Salt Lake City, UT (US)

( * ) Notice: Subject to any disclaimer, the term of this patent is extended or adjusted under 35 U.S.C. 154(b) by 0 days.

(21) Appl. No.: 15/448,151

(22) Filed: Mar. 2, 2017

(65) Prior Publication Data
US 2017/0307654 A1    Oct. 26, 2017

Related U.S. Application Data

(60) Provisional application No. 62/305,619, filed on Mar. 9, 2016.

(51) Int. Cl.
*G01Q 60/10*   (2010.01)
*G01Q 10/04*   (2010.01)

(52) U.S. Cl.
CPC ............ *G01Q 10/04* (2013.01); *G01Q 60/10* (2013.01)

(58) Field of Classification Search
USPC .................... 850/26, 27, 29, 41, 62, 63
See application file for complete search history.

(56) References Cited

U.S. PATENT DOCUMENTS

| | | | |
|---|---|---|---|
| 4,882,609 A | 11/1989 | Schubert et al. | |
| 4,942,299 A * | 7/1990 | Kazmerski | G01Q 30/02 250/307 |
| 5,929,652 A * | 7/1999 | Ahrenkiel | G01R 31/2656 257/E21.531 |
| D695,801 S | 12/2013 | Hagmann et al. | |
| 8,601,607 B2 * | 12/2013 | Hagmann | B82Y 35/00 850/26 |
| 9,075,081 B2 | 7/2015 | Hagmann | |
| 9,442,078 B2 * | 9/2016 | Hagmann | G01Q 60/14 |
| 2012/0066799 A1 | 3/2012 | Esch et al. | |
| 2013/0212751 A1 * | 8/2013 | Hagmann | B82Y 35/00 850/26 |
| 2015/0247809 A1 * | 9/2015 | Hagmann | G01N 22/00 850/26 |

OTHER PUBLICATIONS

Z.J. Donhauser, G.S. McCarty, L.A. Bumm and P.S. Weiss, "High resolution dopant profiling using a tunable AC scanning tunneling microscope," Proceedings of the International Conference on Characterization and Metrology for ULSI Technology (2001) 641-646. (Fig. 2).

(Continued)

*Primary Examiner* — Bernard Souw
(74) *Attorney, Agent, or Firm* — Dobbin IP Law P.C.; Geoffrey E. Dobbin

(57) ABSTRACT

A semiconductor carrier profiling method utilizes a scanning tunneling microscope and shielded probe with an attached spectrum analyzer to measure power loss of a microwave frequency comb generated in a tunneling junction. From this power loss and by utilizing an equivalent circuit or other model, spreading resistance may be determined and carrier density from the spreading resistance. The methodology is non-destructive of the sample and allows scanning across the surface of the sample. By not being destructive, additional analysis methods, like deconvolution, are available for use.

6 Claims, 7 Drawing Sheets

(56) References Cited

OTHER PUBLICATIONS

L. Arnold, W. Krieger and H. Walther, "Laser-frequency mixing in the junction of a scanning tunneling microscope," Appl. Phys. Lett. 51 (1987) 786-788. (Fig. 1).
A. Imtiaz, T.M. Wallis, S.-H. Lim, H. Tanbakuchi, H.P. Huber, A. Hornung, P. Hinterdorfer, J. Smoliner, F. Kienberger and P. Kabos, "Frequency-selective contrast on variably doped p-type silicon with a scanning microwave microscope," J. Appl. Phys. 111 (2012) 093727 (6 pp). (Fig. 1a).
H.P. Huber, I. Humer, M. Hochleitner, M. Fenner, M. Moertelmaier, C. Rankl, A. Imitaz, T.M. Wallis, H. Tanbakuchi, P. Hinterdorfer, P. Kabos, J. Smoliner, J.J. Kopanski and F. Lienberger, "Calibrated nanoscale dopant profiling using a scanning microwave microscope," J. Appl. Phys. 111 (2012) 014301 (9 pp). (Fig. 1a).
C. Durkan and M.E. Welland, "Electronic spin detection in molecules using scanning-tunneling-microscopy-assisted electron-spin resonance," Appl. Phys. Lett. 80 (2002) 458-460. (Fig. 1).
U. Kemiktarak, T. Ndukum, K.C. Schwab and K.L. Ekinci, 'Radio-frequency scanning tunneling microscopy, Nature Letters 450 (2007) 85-89. (Fig. 1a).
T. Kokubo, A. Gallagher and J.L. Hall, "Optical heterodyne detection at a silver scanning tunneling microscope junction," J. Appl. Phys. 85 (1999) 1311-1316. (Fig. 1).
M.J. Hagmann, A. Efimov, A.J. Taylor and D.A. Yarotski, "Microwave frequency-comb generation in a tunneling junction by intermode mixing of ultrafast laser pulses," Appl. Phys. Lett. 99 (2011) 011112 (3 pp). (p. 2, col. 1).
S.S. Stranick and P.S. Weiss, "A tunable microwave frequency alternating current scanning tunneling microscope," Rev. Sci. Instrum. 65 (1994) 918-921. (Fig. 1).
C. Sammet, M. Volcker, W. Krieger and H. Walther, "Optical mixing of CO2-laser radiation in a scanning tunneling microscope," J. Appl. Phys. 78 (1995) 6477-6480. (Fig. 1).
B. Michel, W. Mizutani, R. Schlerle, A. Jarosch, W. Knop, H. Bendickter, W. Bachtold and H. Rohrer, "Scanning surface harmonic microscopy: Scanning probe microscopy based on microwave field-induced harmonic generation," Rev. Sci. Instrum. 63 (1992) 4080-4085. (Fig. 2).
G.P. Kochanski, "Nonlinear alternating-current tunneling microscopy," Phys. Rev. Lett. 62 (1989) 2285-2288. (Fig. 1).
J. Lee, X. Tu and W. Ho, "Spectroscopy and microscopy of spin-sensitive rectification current induced by microwave radiation," Nano Lett. 5 (2005) 2613-2617. (Fig. 1a).
R. Giridharagopal, J. Zhang and K.F. Kelly, "Antenna-based ultra-high vacuum microwave frequency scanning tunneling microscopy systems," Rev. Sci. Instrum. 82 (2011) 053710 (7 pp). (Fig. 1a).
W. Seifert. E. Gerner, M. Stachel and K. Dransfeld, "Scanning tunneling microscopy at microwave frequencies," Ultramicroscopy 42 (1992) 379-387.
J. Schmidt, D.H. Rapoport, G. Behme and H.-J. Frohlich, "Microwave-mixing scanning capacitance microscopy of pn junctions," J. Appl. Phys. 86 (1999) 7094-7099.
M.J. Hagmann, "Microwave tunneling current from the resonant interaction of an amplitude modulated laser with a scanning tunneling microscope," J. Vac. Sci. Technol. B 14 (1996) 838-841.
W. Krieger, A. Homsteiner, E. Soergel, C. Sammet, M. Volcker and H. Walther, "Laser-driven scanning tunneling microscope," Laser Physics 6 (1996) 334-338.
C.C. Williams, "Two-dimensional dopant profiling by scanning capacitance microscopy," Ann. Rev. Mater. Sci. 29 (1999) 471-504.
M.H. Bhuyan, F.M. Mohammedy and Q.D.M. Khosru, "Doping profile measurement and characterization by scanning capacitance microscope for pocket implanted nanoscale n-MOSFET," Int. J. Electr. Electron. Eng. 5 (2011) 260-267.

H.P. Huber, M. Moertelmaier, T.M. Wallis, C.J. Chiang, M. Hochleitner, A. Imtiaz, Y.J. Oh, K. Schilcher, M. Dieudonne, J. Smoliner, P. Hinterdorfer, S.J. rosner, H. Tanbakuchi, P. Kabos and F. Kienberger, "Calibrated nanoscale capacitance measurements using a scanning microwave microscope," Rev. Sci. Instrum. 81 (2010) 113701 (9 pp).
M.J. Hagmann, A.J. Taylor and D.A. Yarotski, "Observation of 200th harmonic with fractional linewidth of 10-10 in a microwave frequency comb generated in a tunneling junction," Appl. Phys. Lett. 101 (2012) 241102 (3 pp).
M.J. Hagmann, S. Pandey, A. Nahata, A.J. Taylor and D.A. Yarotski, "Microwave frequency comb attributed to the formation of dipoles at the surface of a semiconductor by a mode-locked ultrafast laser," Appl. Phys. Lett. 101 (2012) 231102 (3 pp).
T. Komeda and Y. Manassen, "Distribution of frequencies of a single precessing spin detected by scanning tunneling microscope," Appl. Phys. Lett. 92 (2008) 212506 (3 pp).
L.A. Bumm and P.S. Weiss, "Small cavity nonresonant tunable microwave-frequency alternating current scanning tunneling microscope," Rev. Sci. Instrum. 66 (1995) 4140-41145.
C. Saunus, J.R. Bindel, M. Pratzer and M. Morgenstern, "Versatile scanning tunneling microscopy with 120 ps time resolution," Appl. Phys. Lett. 102 (2013) 051601 (4 pp).
D.-J. Kim and J.-Y. Koo, "A low-noise and wide-band ac boosting current-to-voltage amplifier for scanning tunneling microscopy," Rev. Sci. Instrum. 76 (2005) 023703 (4 pp).
F. Demming, K. Dickmann and J. Jersch, "Wide bandwidth transimpedance preamplifier for a scanning tunneling microscope," Rev. Sci. Instrum. 69 (1998) 2406-2408.
F. Keilmann, D.W. van der Weide, T. Eickelkamp, R. Merz and D. Stockle, "Extreme sub-wavelength resolution with a scanning radio-frequency transmission microscope," Optics Comm. 129 (1996) 15-18.
A. Kramer, F. Keilmann, B. Knoll and R. Guckenberger, "The coaxial tip as a nano-antenna for scanning near-field microwave transmission microscopy," Micron 27 (1996) 413-417.
M. Tabib-Azar and Y. Wang, "Design and fabrication of scanning near-field microwave probes compatible with atomic force microscopy to image embedded nanostructures," IEEE Trans. Microwave Theory Tech. 52 (2004) 971-979.
U. Ch. Fischer and M. Zapletal, "The concept of a coaxial tip as a probe for scanning near field optical microscopy and steps towards a realization," Ultramicroscopy 42-44 (1992) 393-398.
J.J. Kopanski, J.F. Marchiando and J.R. Lowney, "Scanning capacitance microscopy measurements and modeling: Progress towards dopant profiling of silicon," J. Vac. Sci. Technol. B 14 (1996) 242-247. (Fig. 7a).
J.F. Marchiando, J.R. Lowney and J.J. Kopanski, "Models for interpreting scanning capacitance microscope measurements," Conference Digest for Scanning Microscopy, vol. 12, (1998) 205-224.
J.A. Strosscio and W.J. Kaiser, eds., Scanning Tunneling Microscopy, Academic Press, Boston, 1993, pp. 71-73.
E. Flaxer, "Bias-controlled mechanism for a scanning tunneling microscope," Meas. Sci. Technol. 17 (2006) N45-N47.
S. Guo, J. Hihath and N. Tao, "Breakdown of atomic-sized metallic contacts measured on nanosecond scale," Nano Lett. 11 (2011) 927-933.
M. Ochmann, H.-J. Munzer, J. Boneberg and P. Leiderer, "A circuit for measuring the gap voltage of a scanning tunneling microscope on a nanosecond time scale," Rev. Sci. Instrum. 70 (1999) 2049-2052.
M.J. Hagmann, F.S. Stenger and D.A. Yarotski, "Linewidth of the harmonics in a microwave frequency comb generated by focusing a mode-locked ultrafast laser on a tunneling junction," J. Appl, Phys. (2013) 114, 223107.
B. Gelmont and M. Shur, "Spreading resistance of a round ohmic contact," Solid-State Electron. vol. 36, No. 2, 1993, pp. 143-146.

* cited by examiner

APPARATUS AND ALGORITHM FOR CARRIER PROFILING IN SCANNING FREQUENCY COMB MICROSCOPY

CROSS-REFERENCES TO RELATED APPLICATIONS

The present invention claims priority as a non-provisional perfection of prior filed U.S. Application No. 62/305,619, filed Mar. 9, 2016, and incorporates the same by reference herein in its entirety.

FIELD OF THE INVENTION

The present invention is an apparatus and method for the carrier profiling of semiconductors, one that more specifically utilizes Scanning Frequency Comb Microscopy and measuring the spreading resistance in the semiconductor at a tunneling junction which has a sub-nanometer radius.

BACKGROUND OF THE INVENTION

The semiconductor industry is at a crisis because much finer resolution is required to meet their needs as they progress to the 10-nm, 7-nm, and finer lithography nodes to meet the demand for improved device performance. For example, while the chip capacity in flash memory increased by 100-fold from 2005 to 2013 the number of reliable state changes decreased at each step to finer lithography so the reliable capacity has actually stagnated [A. A. Chien and V. Karamcheti, "Moore's law: the first ending and a new beginning," IEEE Computer 46 (2013) 48-53].

Roadmaps for the semiconductor industry have required that the spatial resolution in dopant and carrier profiling be finer than 10 percent of the dimension at each lithography node. While atomic resolution has been achieved in dopant profiling with the destructive process of atom probe tomography [K. Inoue, F. Yano, A. Nishida, H. Takamizawa, T. Tsunomura, Y. Nagai and M. Hasegawa, "Dopant distributions in n-MOSFET structure observed by atom probe tomography," Ultramicroscopy 109 (2009) 1479-1484], this provides verification of the device fabrication but carrier profiling is essential to validate how a device will operate. Round-robin testing and status reviews have led the semiconductor industry to select scanning spreading resistance microscopy (SSRM) and scanning capacitance microscopy (SCM) as their primary methods for carrier profiling. SSRM is generally chosen below the 40 nm lithography node where finer resolution is required as it is claimed to provide a sub-nanometer resolution [T. Hantschel, M. Tsigkourakos, L. Zha, T. Nuytten, K. Paredis, B. Majeed, and W. Vandervorst, "Diamond scanning probes with sub-nanometer resolution for advanced nanoelectronics device characterization," Microelectronic Engineering 159 (2016) 46-50] and SCM is generally not used at these finer nodes. However, the actual resolution for this destructive process is approximately 50 nm—comparable with the diameter of the tip-sample contact. At the 7-nm node, which was introduced by IBM in 2015, the resolution obtained with SSRM is approximately seven times the dimension of the node. Thus, at the present time, this deficiency may be likened to trying to manufacture an automobile using a string seven times the length of the car for all measurements.

In SSRM a probe, typically made of diamond which is doped to be electrically conductive, is inserted into the semiconductor and the resistance between this impact point and a much larger contact to the semiconductor is measured. Generally, most of this resistance occurs near the contact, termed "spreading resistance," which is given by $R_S \approx \rho/4a$ for an ohmic conductor, where $\rho$ is the resistivity and $a$ is the radius of the contact. The carrier density may be calculated from the measured resistance. However, the contact between the probe and a semiconductor is not ohmic so it is necessary to use at least one calibration curve made using the same instrument with standardized semiconductors to determine the resistivity of the semiconductor from the measured resistance. The use of calibration curves is made necessary as the physics of the nonohmic interaction have yet to be quantified. As such, any calibration must be made with known measurements of samples of the same material, type of dopant and using the same bias polarity and the same probe.

The contact between the probe and sample is also necessarily destructive of the sample, and often of the probe. The resolution for SSRM is thought to be as fine as 2.5 nm [K. Arstila, T. Hantschel, C. Demeulemeester, A. Moussa and W. Vandervorst, "Microfabricated diamond tip for nanoprobing," Microelectron. Eng. 86 (2009) 1222-1225] or even 1 nm or finer [L. Zhang, H. Tanimoto, K. Adachi and A. Nishiyama, "1-nm spatial resolution in carrier profiling of ultrashallow junctions by scanning spreading resistance microscopy," IEEE Electron Dev. Lett. 29 (2008) 799-801]. However, these dimensions are much smaller than the extent of the lattice distortion that is caused by the nanoindentation of the probes which is required [K. Mylvaganam, L. C. Zhang, P. Eyben, J. Mody and W. Vandervorst, "Evolution of metastable phases in silicon during nanoindentation: mechanism analysis and experimental verification," Nanotechnology 20 (2009) 305705] so it is possible that the results may not be an accurate characterization of the semiconductor.

FIG. 1 shows an SSRM line scan made with a calibration structure that has a number of layers of silicon having different dopant densities [T. Hantschel, et al., Microelectronic Engineering 159, supra]. No error bars are given in FIG. 1 because the destruction of the sample makes it impossible to repeat a line scan. Also, if the resolution were actually 1 nm, one would expect to see a staircase having sharp 90° angles at the corners. However, in this paper which claims to show sub-nanometer resolution, there is a curving at each corner that corresponds to an actual resolution of approximately 50 nm which is the approximate diameter of the tip-sample contact. In theory, deconvolution could be used to remove the roundedness at the corners of the plot in FIG. 1. However, this is not possible with SSRM because the destructive process changes the properties of the sample up to each new point in the line scan. Non-destructive measurements, which are not possible with SSRM, may provide quasi-continuous line scans. Also, deconvolution, when an impulse function is known, can be used to improve resolution when a non-destructive measurement process is used.

Therefore, new technology for carrier profiling is required as the semiconductor industry progresses to finer lithography nodes for progress to new devices having improved performance in accordance with Moore's law. The first commercial products containing devices at the 22 and 14 nm nodes were introduced in 2012 and 2014, respectively. On Jul. 9, 2015, an alliance led by IBM Research announced production of the first 7 nm node test chips with functioning transistors. This step was made ahead of schedule because it had not been expected to occur until 2018-2019. Thus, the rule-of-thumb in roadmaps for the semiconductor industry, that the resolution for carrier profiling should be finer than 10% of the lithography node, requires sub-nanometer resolution at the 7 nm node, and for smaller nodes for which research is already in progress. To summarize, accurate carrier profiling with a resolution of 0.7 nm is now required at the 7 nm node and a resolution of 0.5 nm and 0.2 nm will be required at the 5 nm and 2 nm lithography nodes. Limitations of scanning spreading resistance microscopy:

It is hypothesized that SSRM measurements may actually have several different mechanisms. For example, in carrier profiling by SSRM the ideal relation for spreading resistance, $R=\rho/4a$ (where $\rho$ is the resistivity and a is the radius of a circular contact), is replaced by the nonlinear relation $R=f(\rho)$ requiring calibration with standard samples [P. Eyben, M. Xu, N. Duhayon, T. Clarysse, S. Callewaert and W. Vandervorst, "Scanning spreading resistance microscopy and spectroscopy for routine and quantitative two-dimensional carrier profiling," J. Vac. Sci. Technol. B 20 (2002) 471-478]. Examples of calibration curves, log-log plots of the measured resistance vs. the known resistivity of the standards, are irregular, frequently non-monotonic, and often non-linear with a mean slope as low as 0.6 where 1 would be expected. Furthermore, the measurements are also sensitive to surface states in the semiconductor [P Eyben, S. Denis, T. Clarysse and W. Vandervorst, "Progress towards a physical contact model for scanning spreading resistance microscopy," Mat. Sci. Engineering B 102 (2003) 132-137], and p-type samples and n-type samples of the same semiconductor have distinctly different calibration curves [T. Delaroque, B. Domenges, A. Colder and K. Danilo, "Comprehensive nanostructural study of SSRM nanocontact on silicon," Microelectronics Reliability," 51 (2011) 1693-1696]. This journal article being incorporated by reference herein in its entirety.

Testing the Validity of the Concepts Behind SSRM

For an ideal small circular contact at the surface of a semiconductor the spreading resistance is given by $R_S=\rho/4a$, where $\rho$ is the resistivity and a is the radius of the contact. Thus, if the concept of spreading resistance were appropriate in Scanning Spreading Resistance Microscopy (SSRM) one would expect that $\rho/4R_S$ would be equal to the effective radius of the contact, a. In SSRM, the measured resistance, which is thought to be primarily spreading resistance, is measured in several standard samples of the same semiconductor having different known values of resistivity, and the measured values of $R_S$ are plotted as a function of the resistivity. Then carrier profiling is accomplished by measuring the local spreading resistance at various locations on the test sample and using the calibration data to determine the corresponding values for the local resistivity.

If the conceptual basis of SSRM were valid one would expect that the effective radius of the contact should be independent of the resistivity. FIG. 2 shows the apparent variation of the effective radius as calculated from the calibration data in [T. Hantschel, M. Tsigkourakos, J. Kluge, T. Werner, L. Zha, K. Paredis, P. Eyben, T. Nuytten, Z. Xu and W. Vandervorst, "Overcoated diamond tips for nanometer-scale semiconductor device characterization," Microelectronic Engineering 141 (2015) 1-5], this journal article being incorporated by reference herein in its entirety. Note that there is more than a factor of 5 variation in the effective radius. Most notably, the Full Diamond Tips (FDT) have an effective radius of atomic size (0.1 nm) in one region—which is not reasonable—and ten times this at another point. Furthermore, Overcoated Diamond Tips (OCD), which were reported to provide nanometer resolution, and are described as the best [T. Hantschel, et al., Microelectronic Engineering 141, supra], have an effective radius that is much greater than that for the other two types of tips and exceeds 7 nm at one point.

FIG. 3 shows the apparent variation of the effective radius of the contact as calculated from the calibration data for p-type silicon in Delroque, et al. These data were taken when four different pressures were applied to insert the probes into the standard samples at different unknown depths. Note that the effective radius is increased at greater pressures as would be expected. However, there is about a factor of 3 variation in the effective radius at each pressure, and the dependence of the effective radius on the resistivity is not monotonic and differs appreciably from that shown in FIG. 2.

In conclusion, the method of SSRM can only be used to determine the resistivity of a semiconductor by:

(1) Measuring the resistance of the new semiconductor sample.
(2) Preparing a table with the resistance and resistivity for a group of standard samples prepared using the same semiconductor with different doping densities of the same dopant.
(3) Interpolating the table to determine the resistivity which corresponds to the resistance measured for the new sample.

Previous Uses of a Microwave Frequency Comb

The previous art pertaining to the use of a Microwave Frequency Comb (MFC) for characterizing semiconductors relates to two different methods, SCM and SSRM, which were previously used without the MFC and thus they have different inherent limits for their resolution.

(1) Depletion Capacitance—

U.S. Pat. No. 5,065,103 describes how to make electrical measurements of the depletion capacitance in order to determine the carrier concentration (though they claim dopant concentration) prior to the discovery of the MFC. More recently U.S. Pat. No. 8,601,607 describes how to measure the attenuation of the MFC with a reverse biased semiconductor. Thus a depletion layer is formed in the semiconductor and the effect of the depletion capacitance on the attenuation of the MFC is used to determine the carrier concentration (though it also claims dopant concentration). The resolution using this method would be limited by the fringing capacitance between the base of the depletion layer and the shank and connections to the tip as it is in SCM.

(2) Spreading Resistance—

U.S. Pat. No. 5,585,734 describes how to measure the spreading resistance to determine the carrier concentration prior to the discovery of the MFC. U.S. Pat. No. 9,442,078 describes how to measure the attenuation of the MFC, which is caused by the spreading resistance in order to determine the carrier concentration. All four of these patents being incorporated by reference herein in their entirety.

SUMMARY OF THE INVENTION

The use of a MFC to measure spreading resistance can be further refined than as described in the '078 or '734 patent in a manner to eliminate the need for calibration of the instrument in regards to a given sample. The resultant methodology is also nondestructive to the sample, permits free scanning of the sample, provides a finer effective radius with a tunneling junction (and therefore provides finer resolution), and requires less intensive preparation of STM tips as compared to doped diamond tips utilized in prior art methods. The methodology of the present invention allows for this by measuring a power loss of the MFC at the tunneling junction as the current spreads out therefrom.

Scanning across the sample is possible, in part, because the sample is not destroyed or otherwise altered when undergoing testing that utilizes a MFC. Carrier profiles may, therefore, be made on a local or a global scale by utilizing the methodology herein.

Calculations of the lateral distribution of the tunneling current near the tunneling junction of a scanning tunneling microscope (STM) have been made using the new methodology [M. j. Hagmann and T. E. Henage, "Simplified calculations of the lateral distribution for the current in tunneling junctions having general shapes," Electronics Letters, 52 (2016) 395-397]. These results suggest that the typical resolution would be about 0.5 nm which is an improvement over SSRM by a factor of 100. Furthermore, the impulse response is determined by the new methodology so that in the non-destructive method of scanning frequency comb microscopy it would be possible to use deconvolution to obtain a resolution finer than 0.5 nm.

The new methodology allows for the non-destructive scanning of a semi-conductive sample while accounting for the effects of multiple mechanisms for power attenuation within the sample. Results are interpreted using a circuit model that accounts for these other mechanisms of attenuation in the semi-conductor in addition to the spreading resistance, to provide greater accuracy and finer resolution. Because the methodology is non-destructive and the impulse function is known, deconvolution is not only possible but easily applied. Finally, measurement of the power in the MFC at two points in the circuit allows for direct measurement of the attenuation.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, the preferred embodiment of the method for carrier profiling and an apparatus for conducting the same is herein described. It should be noted that the articles "a", "an", and "the", as used in this specification, include plural referents unless the content clearly dictates otherwise.

A microwave frequency comb (MFC) having hundreds of harmonics that set the present state-of-the-art for a narrow linewidth microwave source may be generated by focusing a mode-locked ultrafast laser on the tunneling junction of a scanning tunneling microscope (STM) [M. J. Hagmann, A. J. Taylor and D. A. Yarotski, "Observation of 200th harmonic with fractional linewidth of $10^{-10}$ in a microwave frequency comb generated in a tunneling junction," Appl. Phys. Lett. 101, 241102 (2012)]. Quasi-periodic excitation of the tunneling junction by the laser superimposes a regular sequence of short (≈15 fs) current pulses on the DC tunneling current, and in the frequency-domain this is equivalent to a microwave frequency comb with harmonics at integer multiples of the pulse repetition frequency of the laser (≈74 MHz).

Figure 4:
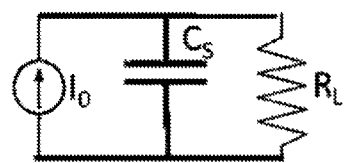
FIG. 4 is a schematic depicting an equivalent circuit for SFCM with a metal sample.

In Scanning Frequency Comb Microscopy (SFCM) the MFC may be measured as the STM is scanned over the surface of an electrically-conductive sample. FIG. 4 is an equivalent circuit for SFCM with a metal sample. In a metal sample, generation of the MFC acts as a constant current source ($I_0$) in the tunneling junction at the sub-terahertz harmonics [M. J. Hagmann, F. S. Stenger and D. A. Yarotski, "Linewidth of the harmonics in a microwave frequency comb generated by focusing a mode-locked ultrafast laser on a tunneling junction," j. Appl. Phys. 114, 223107 (2013)]. This appears to be a non-thermal process because the roll-off in the magnitude of the harmonics at increasing frequency is consistent with a time constant of 320 ps corresponding to shunting the constant current source with the impedance of the measurement instrument which is typically a spectrum analyzer ($R_L$=50 0), and the capacitance ($C_S$≈6.4 pF) that is associated with the tunneling junction and its connections. Typically, the harmonics are measured using a bias-T to couple the spectrum analyzer to the sample circuit of the STM.

In recent measurements where a semiconductor was used as the sample, different carrier processes require the harmonics to be measured with a probe at the surface of the semiconductor within 1 mm of the tunneling junction. Furthermore, the magnitudes of the harmonics fall off more rapidly with increasing frequency. The second harmonic is 9 dB below the fundamental and higher order harmonics fall off as the inverse fourth power of the frequency (12 dB/octave) instead of the inverse second power (6 dB/octave) with metallic samples. Measurements with semiconductors are consistent with the model in FIG. 5 where $R_{S1}$ and $R_{S2}$ are the spreading resistance of the semiconductor at the tunneling junction and the probe, respectively, and $C_2$ is the capacitance to the grounded sample holder. Others have shown [B. Gelmont and M. Shur, "Spreading resistance of a round ohmic contact," Solid-State Electron. Vol. 36, No. 2, 1993, pp. 143-146] that a round ohmic contact with radius a at the surface of a semiconductor having resistivity ρ causes a spreading resistance ($R_S = \rho/4a$) that is the dominant part of the electrical resistance to a contact anywhere on the surface of the semiconductor when that area of that contact is much larger than that of the round ohmic contact. Thus, in FIG. 5, where the tunneling junction is at point $P_1$ and the probe is at point $P_2$, the spreading resistances $R_{S1}$ and $R_{S2}$ act as both series circuit elements and shunts to the grounded sample holder.

Figure 6:
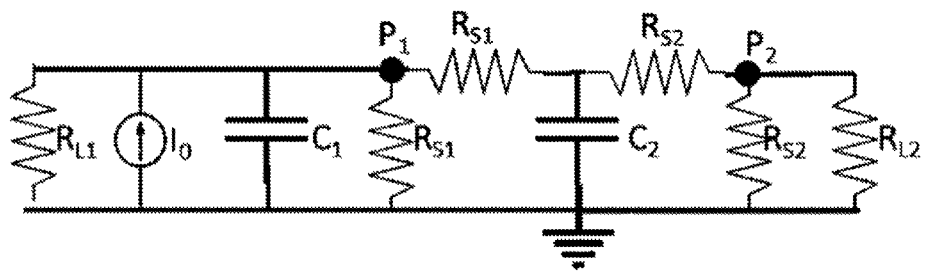
FIG. 6 is a schematic depicting an equivalent circuit for determining the carrier density of a semiconductor

FIG. 6 shows an equivalent circuit of the apparatus used for the carrier profiling of semiconductors in the present invention. In scanning tunneling microscopy typically feedback control is used to maintain a constant DC tunneling current by changing the distance between the tip and sample electrodes. However, in SFCM fluctuations in the magnitude of the harmonics of the MFC occur when the DC tunneling current is relatively stable. I attribute these fluctuations to changes in the capacitance of the tunneling junction when the tip-sample distance is altered in feedback control. To mitigate this problem for greater accuracy, a second load resistance ($R_{L1}$ in FIG. 6), may be added so the power in the harmonics may be sampled in the tip circuit. It is helpful to refer to measurements of the MFC at $R_{L2}$ in the sample circuit as the "transmitted power" because at point $P_2$ in FIG. 6 the MFC has propagated through the semiconductor. Measurements of the power at $R_{L1}$ in the tip-circuit may be used to normalize the measurements of the transmitted power at $R_{L2}$ to mitigate the effects of a number of variables including fluctuations in the DC tunneling current and changes in the capacitance associated with the tunneling junction.

As one skilled in the art should see, it is practical to have $R_{L2}$ be spectrum analyzers with a bias-T so that a DC bias may be applied to the probe, and for $R_{L1}$ to also be a spectrum analyzer including a bias-T to separate the low-frequency preamplifier and control electronics of the STM from the microwave circuit. This may be accomplished by directly attaching a second spectrum analyzer as $R_{L1}$, or attaching a load resistance in series with a directional coupler to which the second spectrum analyzer is connected. Approximation of the equivalent circuit from measurements with a single spectrum analyzer as in FIG. 5:

1. While capacitance $C_1$ in FIG. 6 includes the effect of the tip-sample distance, it is predominantly caused by the connections to the tunneling junction. Thus, a suitable value for a specific STM may be determined from measurements using a metallic sample as already described in Hagmann, et al. (Appl. Phys. Lett. 101, supra), so the measured value of 6.4 pF may be used.

2. I have used a sample of intrinsic n-type GaN with σ≈200 S/m. Assuming r≈1 nm at the tunneling junction, I use 1 MΩ as an estimate for $R_{S1}$.

Figure 1:
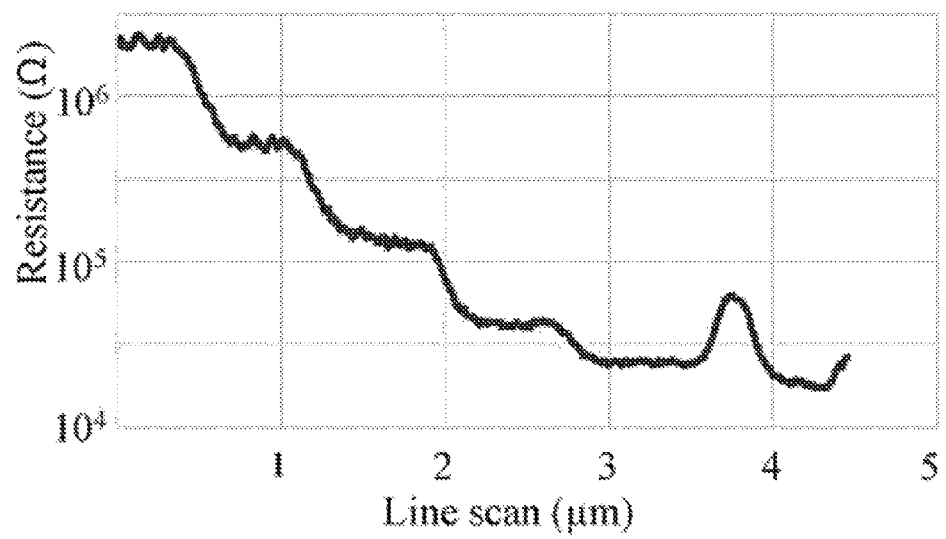
FIG. 1 is a prior art SSRM line-scan made with a "sandwich" sample.
Figure 2:
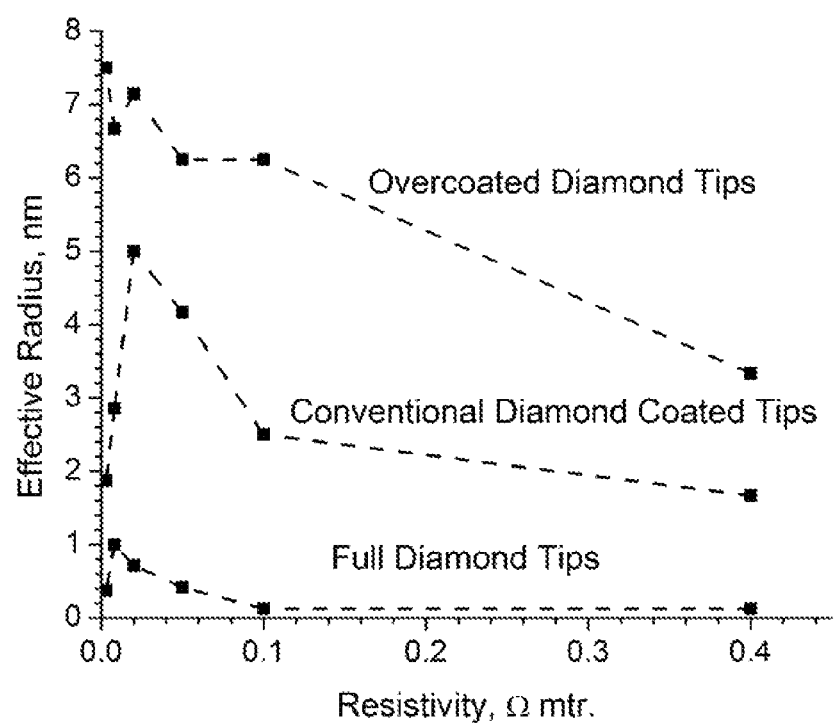
FIG. 2 is a graph depicting effective probe radius vs. resistivity for SSRM measurements (prior art).

3. Simulations of the equivalent circuit in FIG. 2 were used to determine approximate values of $R_{S2}$ and $C_2$ to cause the observed 9 dB roll-off of the second harmonic. These values are consistent with the material properties and dimensions that were used. $R_{S2}=120Ω$ and $C_2=10$ pF.

4. Using the semiconductor sample, I have measured a power of −117 dBm at the fundamental so I have used $I_0=50$ μA as the peak value of the current.

Figure 5:
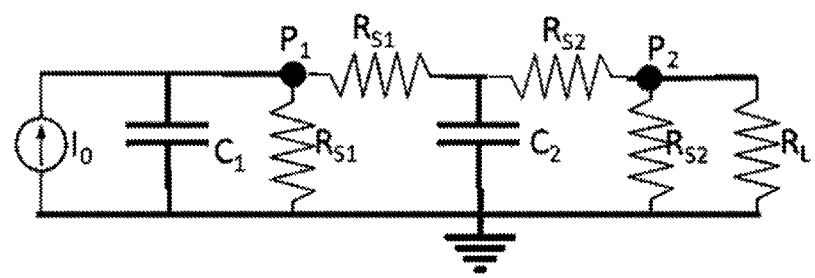
FIG. 5 is a schematic depicting an equivalent circuit for SFCM with a semiconductor sample.

This completes determining the properties for the equivalent circuit in FIG. 5.

Figure 3:
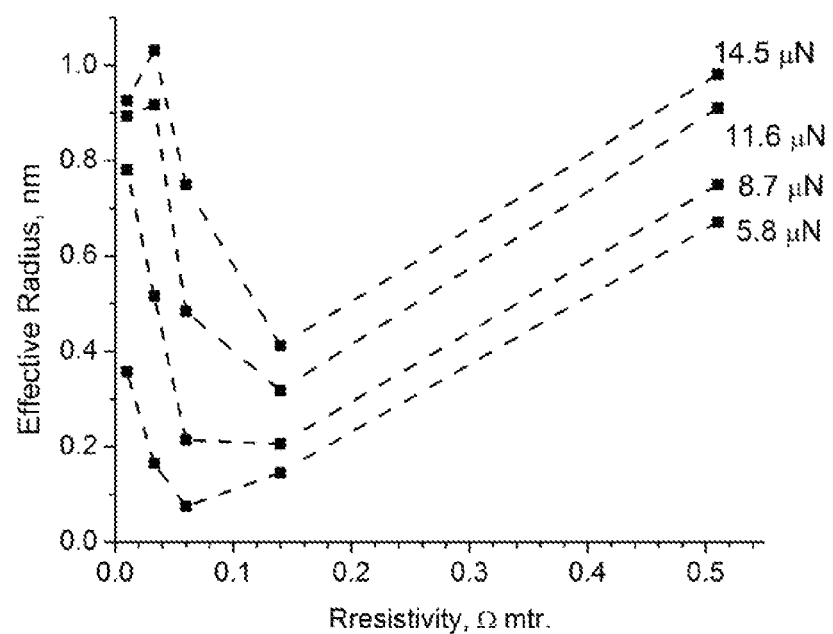
FIG. 3 is a chart depicting effective probe radius vs. resistivity for SSRM Measurements at four different pressures (prior art).

Extension to the Model in FIG. 3 to Predict the Effects of Including the Second Spectrum Analyzer:

From Eq. (A1), the normalized power, γ, defined as the ratio of the average power measured at $R_{L2}$ to that measured at $R_{L1}$, is given by the following expression:

$$\gamma = \frac{R_{L1} R_{L2}}{(R_{S2} + 2R_{L2})^2 \left[ \left[ \left( \frac{R_{S1}}{R_{S2}} \right) \frac{(R_{S2} + R_{L2})}{(R_{S2} + 2R_{L2})} + 1 \right]^2 + (\omega R_{S1} C_2)^2 \right]} \quad (1)$$

Table I gives the spreading resistance that would be measured with a semiconductor for typical values of the radius of the contact (r) and the conductivity of the semiconductor (σ). This table shows that the spreading resistance is typically from 100 kΩ to 100 MΩ. By contrast, the spreading resistance at the probe is typically 100Ω because of the much larger size for the contact. The load resistance $R_{L2}$ for the spectrum analyzer is typically 50Ω. Thus, Eq. (1) may be simplified to obtain Eq. (2). Furthermore, $C_2$ is typically about 10 pF so at a frequency of 74 MHz the second term in the large brackets is comparable to the first term. Note that Eq. (2) shows that the normalized power γ is inversely proportional to the square of the spreading resistance at the tunneling junction $R_{S1}$.

TABLE

Typical values for the spreading resistance.

| a, nm | ρ = .1 Ωm | σ = .01 Ωm | σ = .001 Ωm |
|---|---|---|---|
| .1 | 2.5 × 10⁸ Ω | 2.5 × 10⁷ Ω | 2.5 × 10⁶ Ω |
| 1 | 2.5 × 10⁷ Ω | 2.5 × 10⁶ Ω | 2.5 × 10⁵ Ω |
| 10 | 2.5 × 10⁶ Ω | 2.5 × 10⁵ Ω | 2.5 × 10⁴ Ω |
| 100 | 2.5 × 10⁵ Ω | 2.5 × 10⁴ Ω | 2.5 × 10³ Ω |

$$\gamma = \frac{R_{L1} R_{L2}}{\left[ 1 + 2\left( \frac{R_{L2}}{R_{S2}} \right) \right]^2 \left[ \left( \frac{(R_{S2} + R_{L2})}{(R_{S2} + 2R_{L2})} \right)^2 + (\omega R_{S2} C_2)^2 \right] R_{S1}^2} \quad (2)$$

Numerical simulations for the equivalent circuit in FIG. 3 were made by assigning values to all of the components and then using complex notation to determine the impedance presented to the constant current source. Then the voltage across this source was calculated, and values for the currents and voltages in each part of the circuit were determined. To be consistent with the above calculations which are based on the measurements the values of the input parameters were as follows: $I_0=50$ μA peak, $C_1=6.4$ pF, $C_2=10$ pF, $R_{L2}=50Ω$, $R_{S2}=120Ω$, and $R_{S1}$ and $R_{L1}$ were varied as described in the following two figures. The frequency used was 74.254 MHz to be consistent with the measurements.

Figure 7:
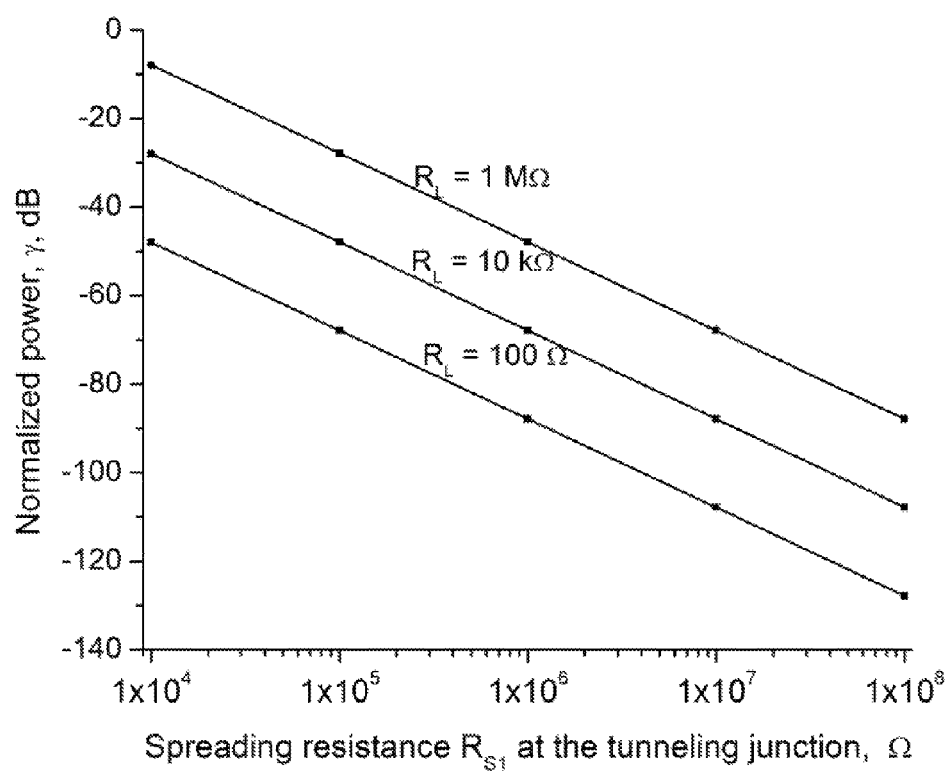
FIG. 7 is a graph depicting normalized power γ vs. spreading resistance at the tunneling junction for three values of $R_{L1}$, the load resistance in the tip circuit.

FIG. 7 shows the normalized power γ as a function of $R_{S1}$, the spreading resistance of the semiconductor at the tunneling junction, for load resistances $R_{L1}$ of 100Ω, 10 kΩ, and 1 MΩ in the tip circuit. The values shown in FIG. 7 from the simulations are equal to those determined separately by using Eq. (2), as a verification of that equation. Again, note that the normalized power γ is inversely proportional to the square of the spreading resistance at the tunneling junction $R_{S1}$, which makes measurements with this method highly sensitive to the spreading resistance even though the magnitude of this resistance may be quite large.

Figure 8:
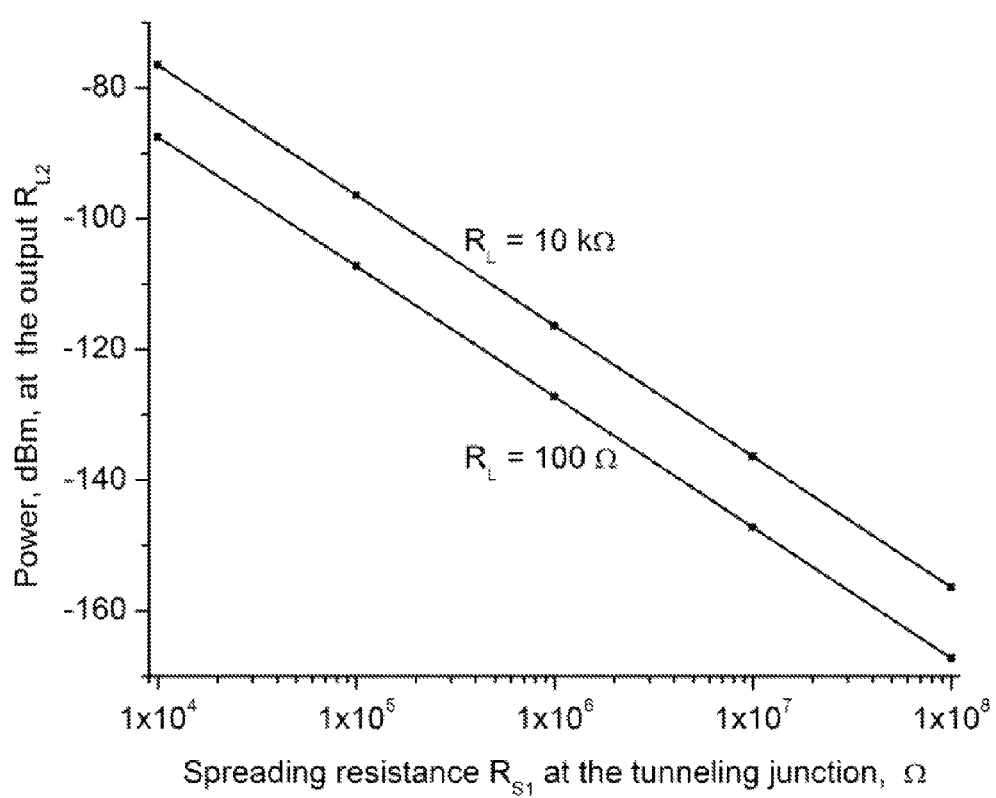
FIG. 8 is a graph depicting power at the spectrum analyzer $R_{L2}$ vs. spreading resistance at the tunneling junction for two values of $R_{L1}$, the load resistance in the tip circuit.

FIG. 8 shows the power at the spectrum analyzer $R_{L2}$ as a function of the spreading resistance of the semiconductor at the tunneling junction for load resistances $R_{L1}$ of 100Ω and 10 kΩ in the tip circuit. Values of 10 kΩ or greater for $R_{L1}$ have no significant effect on the power that is transmitted through the semiconductor and measured at $R_{L2}$ so curves for higher values of $R_{L1}$ would coincide with the curve for 10 kΩ in FIG. 8. Thus, $R_{L1}$ could be a series resistor of 10 kΩ or greater with a spectrum analyzer attached to a directional coupler to measure the power in the tip circuit. FIG. 8 also shows that a spectrum analyzer with a 50Ω input impedance could be attached directly as $R_{L1}$. However, values of $R_{L1}$ lower than 50Ω would make it necessary to increase the power in the MFC to have the measurements at $R_{L2}$ above the noise level for the system.

Changes in the spreading resistance at the tunneling junction have a small effect on the power that is absorbed by the reference load $R_{L1}$. Variation of the spreading resistance $R_{S1}$ over the range from $10^4$ to $10^8$ Ω would cause the load resistance $R_{L1}$ equal to 100Ω, 10 kΩ and 1 MΩ to have powers with mean values of 114 nW, 14 nW, and 140 pW and standard deviations that are 1.6%, 0.41%, and 0.22% of each respective mean. This is one example of the high stability for the reference power in $R_{L1}$.

Figure 9:
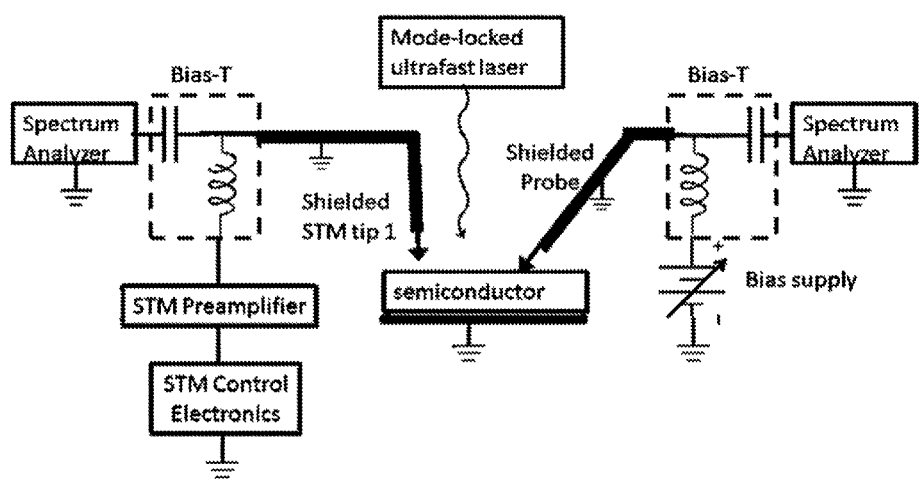
FIG. 9 is a schematic depicting an apparatus suitable for carrying out one method of the invention.

FIG. 9 is a sketch of one possible implementation of the apparatus for practicing the art of this invention. In this sketch $R_{L1}$ of the equivalent circuit in FIG. 6 is shown as a spectrum analyzer but I have also described how a directional coupler and a load resistor could also be used with a spectrum analyzer as $R_{L1}$. In order to make accurate microwave measurements it is necessary that the microwave energy be coupled to the semiconductor using a microwave transmission line, such as semi-rigid miniature coaxial cable. This is not generally done in a scanning tunneling microscope, but the art for doing this has already been described in U.S. Pat. No. 9,075,081, which is incorporated herein by reference in its entirety.

It is recommended that capacitance $C_2$ and spreading resistance $R_\Omega$ be measured using a network analyzer attached to the surface probe before the microwave frequency comb is enabled for scanning frequency comb microscopy. Other means of obtaining these measurements are possible, but not preferred.

Measurements of the microwave frequency comb may be used to determine the normalized power γ at two or more harmonics to test for consistency with the previously measured values of $R_2$ and $C_2$. Consistency may be tested since $R_{L2}$ (typically 50Ω) and the measurement frequencies are known, so that Eq. (A2) should be satisfied by using the measured values of $R_2$ and $C_2$ with the values of γ for each pair of the measured harmonics. By following this procedure, it is possible to reduce or perhaps eliminate the need for calibration—which would require making repeated measurements with standard samples.

Figure 10:
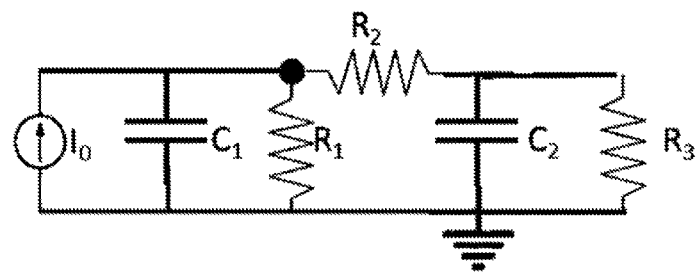
FIG. 10 is a schematic of a simplified equivalent circuit for either of the circuits shown in either FIG. 5 or FIG. 6.

Normalized power (γ) may be determined in the following manner, based on the equivalent circuit shown in FIG. 10: Two branches with impedances $Z_1$ and $Z_2$ are in parallel across the constant current source:

$$Z_1 = R_2 + \frac{R_3}{1 + j\omega R_3 C_2} = \frac{(R_2 + R_3) + j\omega R_2 R_3 C_2}{1 + j\omega R_3 C_2};$$

$$Z_2 = \frac{R_1}{1 + j\omega R_1 C_1}$$

$$Z_{\text{effective}} = \frac{R_1(R_2 + R_3) + j\omega R_1 R_2 R_3 C_2}{\begin{bmatrix} (R_1 + R_2 + R_3 - \omega^2 R_1 R_2 R_3 C_1 C_2) + \\ j\omega(R_1 R_2 C_1 + R_1 R_3 C_1 + R_1 R_3 C_2 + R_2 R_3 C_2) \end{bmatrix}}$$

Voltage across the constant current source:

$$V_{CCS} = \frac{[R_1(R_2 + R_3) + j\omega R_1 R_2 R_3 C_2]I_0}{[(R_1 + R_2 + R_3 - \omega^2 R_1 R_2 R_3 C_1 C_2) + j\omega(R_1 R_2 C_1 + R_1 R_3 C_1 + R_2 R_3 C_2 + R_1 R_3 C_2)]}$$

$$V_{CCS} = \frac{\begin{bmatrix} [(R_1 + R_2 + R_3 - \omega^2 R_1 R_2 R_3 C_1 C_2) - \\ j\omega(R_1 R_2 C_1 + R_1 R_3 C_1 + R_2 R_3 C_2 + R_1 R_3 C_2)] \\ [R_1(R_2 + R_3) + j\omega R_1 R_2 R_3 C_2]I_0 \end{bmatrix}}{(R_1 + R_2 + R_3 - \omega^2 R_1 R_2 R_3 C_1 C_2)^2 + \omega^2(R_1 R_2 C_1 + R_1 R_3 C_1 + R_2 R_3 C_2 + R_1 R_3 C_2)^2}$$

$$V_{CCS} = \frac{\begin{bmatrix} [(R_2 + R_3)(R_1 + R_2 + R_3) + \\ \omega^2 R_2 R_3^2 C_2^2 (R_1 + R_2)] - \\ j\omega R_1(R_2^2 C_1 + 2R_2 R_3 C_1 + \\ R_3^2 C_1 + R_3^2 C_2 + \omega^2 R_2^2 R_3^2 C_1 C_2^2) \end{bmatrix} R_1 I_0}{[(R_1 + R_2 + R_3 - \omega^2 R_1 R_2 R_3 C_1 C_2)^2 + \omega^2(R_1 R_2 C_1 + R_1 R_3 C_1 + R_2 R_3 C_2 + R_1 R_3 C_2)^2]}$$

With peak values for the voltage and current the average power from the constant current source $$\bar{P}_{CCS} = Re(V_{CCS} I_0^*)$$

$$= \frac{[(R_2 + R_3)(R_1 + R_2 + R_3) + \omega^2 R_2 R_3^2 C_2^2 (R_1 + R_2)]R_1 I_0^2}{2[(R_1 + R_2 + R_3 - \omega^2 R_1 R_2 R_3 C_1 C_2)^2 + \omega^2(R_1 R_2 C_1 + R_1 R_3 C_1 + R_2 R_3 C_2 + R_1 R_3 C_2)^2]}$$

Transformation between the equivalent circuit in FIG. 3 and the above equations for FIG. 7 requires:

$$R_{S2} + \frac{R_{S2} R_{L2}}{R_{S2} + R_{L2}} \leftrightarrow R_3, \frac{R_{S1} R_{L1}}{R_{S1} + R_{L1}} \leftrightarrow R_1, \text{ and}$$

$$R_{S1} \leftrightarrow R_2$$

The voltage across resistor $R_{L1}$ is $V_{CCS}$, so $$\bar{P}_{RL1} = \frac{|V_{CCS}|^2}{2R_{L1}}$$

The current in $R_3$ is given by $$I_3 = \left(1 - \frac{R_2}{Z_1}\right)\frac{V_{CCS}}{R_3}$$

Thus, in FIG. 3 the current in $R_{S2}$ is $$I_{RS2} = \left(1 - \frac{R_{S1}}{Z_1}\right)\frac{V_{CCS}}{\left(R_{S2} + \frac{R_{S2}R_{L2}}{R_{S2} + R_{L2}}\right)}$$

so the current in $R_{L2}$ is $$I_{RL2} = \left(1 - \frac{R_{S1}}{Z_1}\right)\frac{V_{CCS}}{\left(R_{S2} + \frac{R_{S2}R_{L2}}{R_{S2} + R_{L2}}\right)\left(1 + \frac{R_{L2}}{R_{S2}}\right)}$$

$$= \left(1 - \frac{R_{S1}}{Z_1}\right)\frac{V_{CCS}}{(R_{S2} + 2R_{L2})}$$

Thus, $$\overline{P}_{RL2} = \left(1 - \frac{R_{S1}}{Z_1}\right)\left(1 - \frac{R_{S1}}{Z_1^*}\right)\frac{R_{L2}|V_{CCS}|^2}{2(R_{S2} + 2R_{L2})^2}$$

Normalizing, we define $$\gamma \equiv \frac{\overline{P}_{RL2}}{\overline{P}_{RL1}} = \left(1 - \frac{R_{S1}}{Z_1}\right)\left(1 - \frac{R_{S1}}{Z_1^*}\right)\frac{R_{L1}R_{L2}}{(R_{S2} + 2R_{L2})^2}$$

$$\gamma = \frac{R_{L1}R_{L2}\left[(R_{S1} - R_2 - R_3)^2 + \omega^2 R_3^2 C_2^2 (R_{S1} - R_2)^2\right]}{(R_{S2} + 2R_{L2})^2 [(R_2 + R_3)^2 + \omega^2 R_2^2 R_3^2 C_2^2]}$$

Comparing FIGS. 3 and 7, $R_2 \rightarrow R_{S1}$ and $$R_3 \rightarrow R_{S2} + \frac{R_{S2}R_{L2}}{R_{S2} + R_{L2}}$$

so that $$\gamma = \frac{R_{L1}R_{L2}\left(R_{S2} + \frac{R_{S2}R_{L2}}{R_{S2} + R_{L2}}\right)^2}{(R_{S2} + 2R_{L2})^2\left[\left(R_{S1} + R_{S2} + \frac{R_{S2}R_{L2}}{R_{S2} + R_{L2}}\right)^2 + \omega^2 R_{S1}^2\left(R_{S2} + \frac{R_{S2}R_{L2}}{R_{S2} + R_{L2}}\right)^2 C_2^2\right]} \quad (A1)$$

$$\gamma = \frac{R_{L1}R_{L2}}{(R_{S2} + 2R_{L2})^2\left[\left(\left(\frac{R_{S1}}{R_{S2}}\right)\frac{(R_{S2} + R_{L2})}{(R_{S2} + 2R_{L2})} + 1\right)^2 + (\omega R_{S1} C_2)^2\right]}$$

When $R_{S1}$ is large, $$\frac{\gamma(f_2)}{\gamma(f_1)} = \frac{1 + (2\pi f_1 R_{S2} C_2)^2 \left(\frac{R_{S2} + 2R_{L2}}{R_{S2} + R_{L2}}\right)^2}{1 + (2\pi f_2 R_{S2} C_2)^2 \left(\frac{R_{S2} + 2R_{L2}}{R_{S2} + R_{L2}}\right)^2} \quad (A2)$$

The advantages over the prior art are not only finer resolution, but a non-destructive process which allows for repeatable testing the same sample over many areas of the sample, and lessened time in tip preparation as the use of larger tips is feasible in the methodology.

APPLICATIONS OF THE METHODOLOGY

Because the methodology is non-destructive, deconvolution strategies may be employed. As an example, a known sample with a defined variation in dopant density may be measured. The measurement may then be deconvolved to determine the impulse function of the STM. Once this impulse function is known, it may be used to deconvolve measurements taken from unknown samples.

Likewise, the equivalent circuits may be used with measurements to determine the spreading resistance of a semiconductor sample at the tunneling junction, and therefore the carrier density. By measuring known sources of attenuation, such as shunting capacitance of the semi-conductor sample and spreading resistance from the probe, the remaining attenuation may be evaluated to determine spreading resistance at the tunneling junction. These known sources of attenuation may be measured by any means known now or later developed, including using a network analyzer connected to the probe.

Although the present invention has been described with reference to preferred embodiments, numerous modifications and variations can be made and still the result will come within the scope of the invention. As an example, the equivalent circuit model may be replaced with a field model, utilizing Maxwell's equations, by one skilled in the art. However, because the wavelengths in the MFC are much larger than the separation between the probe and the tunneling junction, it is generally found to be more convenient to utilize equivalent circuits to model the methodology. No limitation with respect to the specific embodiments disclosed herein is intended or should be inferred.

I claim:

1. A method to determine carrier concentration of a semiconductor sample, the method comprising:
    a. placing the semiconductor sample in a scanning tunneling microscope ("STM"), the STM comprising a tip circuit with a preamplifier and a shielded STM tip, the shielded STM tip being in proximity with, but not in contact with, the semiconductor sample, forming a tunneling junction;
    b. placing a probe in contact with the semiconductor sample in proximity to the STM tip, the probe having functional connection with a bias supply and a spectrum analyzer, forming a probe circuit, the probe circuit and tip circuit forming a system;
    c. irradiating the sample with a mode-locked ultrafast laser, generating a microwave frequency comb in the tunneling junction;

d. measuring the power of a given harmonic of the microwave frequency comb with the spectrum analyzer and pausing to adequately measure the measured power;
e. determining the localized spreading resistance of the semiconductor sample at the tunneling junction from the measured power;
f. repeating the steps b-e while positioning the STM tip and the probe at another location relative to the semiconductor sample, maintaining the proximity between the STM tip and probe;
g. using data from repeated measurements to determine carrier concentration of the semiconductor sample.

2. The method of claim 1, additionally providing a second spectrum analyzer in functional connection with the STM tip, the first and second spectrum analyzers being used to measure attenuation of the microwave frequency comb.

3. The method of claim 2, further comprising the step of determining attenuation caused by at least one other component in an equivalent circuit of the system.

4. The method of claim 3, the determination of attenuation being accomplished by utilizing a network analyzer in operative connection with the probe circuit.

5. The method of claim 1, further comprising the step of determining an impulse function by utilizing a known sample with a sharp boundary of two different dopant densities and deconvolving a measured carrier density, then using the impulse function for further measurements on unknown samples.

6. An apparatus to determine carrier concentration of a semiconductor sample, the apparatus comprising:
   a. A scanning tunneling microscope ("STM"), the STM further comprising a tip circuit with a preamplifier and a shielded STM tip, the shielded STM tip being in proximity with, but not in contact with, the semiconductor sample, forming a tunneling junction;
   b. A first spectrum analyzer in operative communication with the tip circuit;
   c. A sample circuit formed by a probe in contact with the semiconductor sample in proximity to the STM tip, the probe having functional connection with a bias supply and a second spectrum analyzer; and
   d. a mode-locked ultrafast laser;
wherein, the mode locked ultrafast laser irradiates the sample, forming a microwave frequency comb within the tunneling junction.

* * * * *